United States Patent
Ramanathan et al.

(10) Patent No.: US 9,960,910 B2
(45) Date of Patent: May 1, 2018

(54) ENCRYPTED DIGITAL CIRCUIT DESCRIPTION ALLOWING SIGNAL DELAY SIMULATION

(71) Applicant: Wisconsin Alumni Research Foundation, Madison, WI (US)

(72) Inventors: Parameswaran Ramanathan, Madison, WI (US); Kewal Saluja, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 176 days.

(21) Appl. No.: 15/053,255

(22) Filed: Feb. 25, 2016

(65) Prior Publication Data

US 2017/0250800 A1    Aug. 31, 2017

(51) Int. Cl.
*H04L 29/06* (2006.01)
*H04L 9/06* (2006.01)
*G06F 21/62* (2013.01)

(52) U.S. Cl.
CPC ........ *H04L 9/0656* (2013.01); *G06F 21/6218* (2013.01)

(58) Field of Classification Search
CPC .......................... H04L 9/0656; G06F 21/6218
See application file for complete search history.

(56) References Cited

U.S. PATENT DOCUMENTS

| | | | | |
|---|---|---|---|---|
| 3,657,476 A * | 4/1972 | Aiken | ................... | H04L 9/0662 331/78 |
| 6,345,359 B1 * | 2/2002 | Bianco | ................ | G06F 12/1408 711/E12.092 |
| 7,131,091 B1 | 10/2006 | Ganesan et al. | | |
| 7,165,229 B1 | 1/2007 | Gathoo et al. | | |
| 7,574,679 B1 | 8/2009 | Gathoo et al. | | |
| 7,685,418 B1 | 3/2010 | Knight | | |
| 7,721,090 B1 | 5/2010 | Deepak et al. | | |
| 8,010,782 B2 | 8/2011 | Kerschbaum | | |
| 8,417,965 B1 | 4/2013 | Sundararajan et al. | | |
| 8,824,672 B1 | 9/2014 | Gomathisankaran et al. | | |
| 2003/0198343 A1 | 10/2003 | Morioka et al. | | |
| 2004/0071287 A1 * | 4/2004 | Alexander | ............ | H04L 9/0631 380/29 |
| 2006/0114135 A1 | 6/2006 | Whitaker et al. | | |
| 2007/0116283 A1 | 5/2007 | Tuyls et al. | | |
| 2013/0346928 A1 | 12/2013 | Li et al. | | |

(Continued)

OTHER PUBLICATIONS

Kim Le et al.; "Privacy Assurances in Data-Aggregation for Multiple MAX Transactions." In Computer Software and Applications Conference (COMPSAC), 2015 IEEE 39th Annual, vol. 3. pp. 110-115. IEEE, 2015. US.

(Continued)

*Primary Examiner* — Sarah Su
(74) *Attorney, Agent, or Firm* — Boyle Fredrickson, S.C.

(57) ABSTRACT

A system for creating protected functional descriptions of integrated circuits provides encrypted gate delay information preventing deduction of gate function from gate delay but allowing simulation of the integrated circuit with accurate propagation delay calculation. Individual gate delay values may be modified so that they obscure actual gate delays but so that the modified individual gate delays total to equal the actual cumulative gate delay along a given data propagation path.

20 Claims, 4 Drawing Sheets

(56) References Cited

U.S. PATENT DOCUMENTS

2014/0093077 A1    4/2014  Jawurek et al.
2015/0188661 A1*   7/2015  Millican ............. G06F 17/5009
                                                        380/287
2017/0010989 A1*   1/2017  Sugahara ............ G06F 13/1689

OTHER PUBLICATIONS

Kim Le et al.; "Privacy Assurances in Multiple Data-Aggregation Transactions." In Information Security and Cryptology—ICISC 2013, pp. 3-19. Springer International Publishing, 2013.US.

\* cited by examiner

ENCRYPTED DIGITAL CIRCUIT DESCRIPTION ALLOWING SIGNAL DELAY SIMULATION

STATEMENT REGARDING FEDERALLY SPONSORED RESEARCH OR DEVELOPMENT

- - -

CROSS REFERENCE TO RELATED APPLICATION

- - -

BACKGROUND OF THE INVENTION

The present invention relates to integrated circuits and in particular, to an electronic description of an integrated circuit that is encrypted to prevent the details of the circuit from being revealed while still allowing simulation of the integrated circuit, and in particular, allowing gate delays to be simulated.

Complex integrated circuits, such as "system on chip" (SOC) designs, can be constructed from circuit "building blocks" developed by different companies. The building blocks are assembled by combining electronic files describing each building block to produce the necessary integrated circuit masks needed to produce the ultimate integrated circuit.

These building blocks are often referred to as intellectual property (IP) cores, reflecting the fact that it is the underlying design (the intellectual property) that is sold by the designer as opposed to an actual integrated circuit. The ability to license IP cores provides substantial efficiency in the design of complex circuit elements by allowing the costs of developing an IP core to be shared among multiple manufacturers.

The abstract IP core is captured in an electronically readable circuit-level schematic describing each component, for example, logic gates and their interconnection, together with a functional description of the inputs and outputs to the IP core (the functional specification). While the sale of an IP core may include this entire functional specification (a so-called "soft" core), it is also possible to sell an electronic description of an IP core that provides only layout information and the functional description of the inputs and outputs without the circuit level schematic. This so-called "hard" core allows fabrication of the IP core but does not reveal information about the internal circuit configuration or components, preventing ready copying or modification of the IP core.

Normally a hard-core license for an IP core will be cheaper than a soft-core license because the hard-core license, by hiding the circuit design, reduces the risk that the purchaser will be able to compete with or develop commercial alternatives to the IP core or that the intellectual property of the IP core will be revealed. Nevertheless, the less-expensive hard-core license has significant drawbacks. Because the details of the underlying circuit are hidden, it is not possible to simulate the IP core alone or in combination with the other building block circuits. The ability to simulate operation of the IP core allows better integration with other circuit elements, for example, by revealing operating limitations such as signal propagation delays that need to be accommodated. Simulation is also important to identify how component faults will affect the IP core. Such fault simulation allows the end user to construct more efficient "built-in self test" (BIST) logic that can be used to test the operation of the IP core during manufacture. Generally, BIST logic identifies bit patterns or vectors that are used to detect faults in a logic circuit.

The practical ability to select only between a hard-core or soft-core licensing model substantially limits the market for IP cores in many important applications where IP core simulation is required but where purchasing a soft-core license is too costly.

US patent application 2015/0188661, assigned to the assignee of the present application and hereby incorporated by reference (henceforth the Logical Encryption Invention), describes a system for producing an encrypted description of the logic elements (gates) of an integrated circuit that allows operation of the integrated circuit to be simulated without the gates being identifiable as to function. The encrypted description of logic elements can be used by simulators without decryption. This invention makes it possible to license IP cores in a way that provides the intellectual property protection associated with hard-core licensing while allowing the logical simulation capabilities associated with soft-core licensing. This simulation permits fault analysis and the development of bit vectors for BIST logic.

In simulating an integrated circuit, it can also be important to be able to accurately model signal propagation delays through the integrated circuit. The Logical Encryption Invention identifies the gates and their interconnection (although not their function) and thus allows rough estimates for gate delays to be calculated, for example, by assuming all gates have an average standard gate delay. Such an approach is inadequate for sophisticated circuit simulation where accurate propagation delays need to be calculated. Generally, gate delays vary meaningfully between different types of gates both according to their logical function and their circuit level architecture (e.g., size of transistors, etc.).

Revealing detailed gate delay information for each gate can undercut the intellectual property protection of the integrated circuit. For example, it may be possible to deduce the function of gate from its gate delay.

Equally important, independent of an interest in preserving the secrecy of the gate functions, the manufacturer may wish to preserve secrecy with respect to gate delay values themselves. Gate delays of each gate instance are often tailored by the manufacturer for improved integrated circuit performance, and this information also represents important intellectual property.

SUMMARY OF THE INVENTION

The present invention provides a way of encrypting gate delay information to prevent the practical identification of the gate delay of any given gate while still allowing signal propagation delays through the integrated circuit to be accurately modeled. The encrypted gate delay information can be used by circuit simulators without decryption and with little or no adjustment in the simulator design. In this way, the present invention makes it possible to license IP cores in a way that provides the intellectual property protection of the gate delay characteristic of a hard-core license while allowing the delay simulation associated with soft-core licensing. The invention may be used alone or in combination with encryption of the logical gate function.

In one embodiment, the invention provides pseudo-gate delay values for each node (gate) in the IP core. While the pseudo-gate delay values will differ from the actual delays for each gate, they are selected so that for any path through a set of gates from an input to an output, the sum of the pseudo-gate delays will equal the sum of actual gate delays.

Specifically, then, in one embodiment, the invention provides an encryptor for digital circuit description files operating on an electronic computer executing a program. The computer operates to receive electronically readable input data defining an underlying digital circuit having multiple interconnected nodes each implementing standard Boolean functions and interconnecting between a set of inputs and a set of outputs, the input data describing the interconnection of the nodes, the Boolean functions of the nodes, and actual signal propagation delays associated with the nodes. Using this input data, the computer creates encrypted output data describing the interconnection of the nodes and providing an encryption of the actual signal propagation delays, the encryption of the actual signal propagation delays permitting computation of cumulative signal propagation delays between the set of inputs and set of outputs without knowledge of the actual signal propagation delays of the nodes. This output data is then provided to the user in a form adapted to permit a simulation of the underlying digital circuit to provide a simulation set of outputs having propagation delays with respect to a simulation set of inputs identical to propagation delays at the set of outputs of the underlying digital circuit receiving the simulation inputs at the set of inputs of the underlying digital circuit.

It is thus a feature of at least one embodiment of the invention to provide information about signal delay through an integrated circuit without revealing information about the underlying functional design of the integrated circuit.

The encryption of the actual signal propagation may replace actual signal propagation delays for at least some given nodes with pseudo-propagation delay different from the actual propagation delay of given nodes.

It is thus a feature of at least one embodiment of the invention to provide a system that is highly compatible with existing simulation systems that may receive actual signal propagation delay information. In these systems, the pseudo-propagation delay information may simply replace the actual signal propagation delay information.

The pseudo-propagation delay may add an offset value to the actual signal propagation delay for that node where the actual offset value varies among nodes.

It is thus a feature of at least one embodiment of the invention to provide a simple encryption system that may be readily implemented at high speed. The present inventors have determined that offsetting coding provides substantial protection to the underlying actual signal propagation delay information.

The offset values may be selected so that the offset values along a path through a given set of nodes from the input set to the output set sum to zero.

It is thus a feature of at least one embodiment of the invention to provide a system that can work with simulators without decryption simply by ensuring that the offset values for each gate cancel along all signal paths.

The encryption of the actual signal propagation delays associated with a path between nodes n and m may be equal to an actual gate delay of node n plus an arbitrary offset minus an arbitrary offset associated with a path to an input of node n.

It is thus a feature of at least one embodiment of the invention provide a tractable process for randomizing gate signal delays while ensuring cancellation of the offsets over an entire signal path between input and output points.

The arbitrary offsets on paths to each given node n may be equal.

It is thus a feature of at least one embodiment of the invention to provide a simple methodology for generating offsets that sum to zero over a path from the input to output.

A given node may get different pseudo-propagation delays for each edge between an output of the given node and an input of another node.

It is thus a feature of at least one embodiment of the invention to electrically separate the paths between nodes to provide for simple compensation for the offset values.

The actual propagation delays may provide different delay values for different node states defined by the current inputs of the node and previous inputs of the node and wherein a pseudo-propagation delay is provided for each different delay value.

It is thus a feature of at least one embodiment of the invention to provide the encryption of the present invention with the state-aware delay simulators.

The function of the nodes may be described by an unencrypted truth table having entries that link input values of nodes to output values from the nodes according to the functions of the nodes, and the encrypted output data may include encrypted truth tables permitting computation of node outputs from node inputs according to the function of the nodes where the encrypted truth tables are different from corresponding unencrypted truth tables by having at least one row representing a relationship between input and output values not in the corresponding unencrypted truth tables. The encrypted output data may be in a form adapted to permit a simulation of the digital circuit using the encrypted truth tables without decryption to receive inputs and provide outputs for the nodes; the simulation receiving unencrypted simulation inputs provides simulation outputs identical to output of the digital circuit receiving the unencrypted simulation inputs.

It is thus a feature of at least one embodiment of the invention to permit encryption both of node function and node delays.

These particular objects and advantages may apply to only some embodiments falling within the claims and thus do not define the scope of the invention.

DETAILED DESCRIPTION OF THE PREFERRED EMBODIMENT

Figure 1:
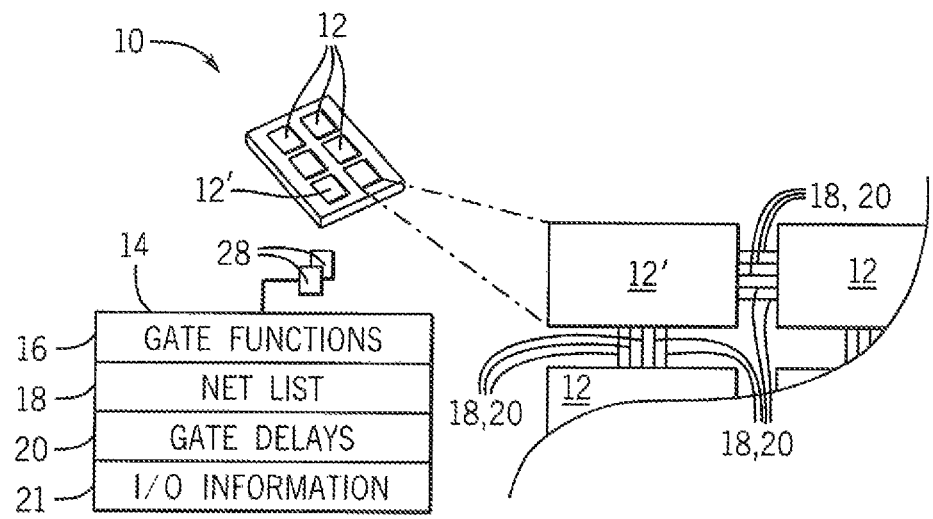
FIG. 1 is a simplified perspective view of an integrated circuit constructed of multiple circuits including at least one IP core and showing the interconnection between the IP core and other circuit elements.

Referring now to FIG. 1, an integrated circuit 10, such as a system on a chip (SOC), may provide for multiple interconnected circuit blocks, herein termed "cores" 12, including at least one IP core 12' that may be fully described by an unencrypted functional description 14 of the IP core suitable for manufacturing, modifying and simulating the IP core 12' as may be obtained under a soft-core license discussed above.

Generally, the unencrypted functional description 14 will be an electronic data file providing a gate list 16 identifying each gate to a gate function (typically expressed as an unencrypted truth table 28) and a netlist 18 providing a description of the interconnection of those gates. A table of gate delays 20 may also be included indicating the signal propagation delay times through the gates along various paths at various gate states.

The unencrypted functional description 14 may include other interconnection information 21 such as a short description of the input and output points of the IP core 12' that may be used to connect the IP core 12' to other cores 12 or glue logic of the integrated circuit 10. This input and output information of the interconnection information 21 may, for example, identify particular inputs and outputs according to functions such as particular data lines or clock signals and their electrical characteristics related to a disclosed function of the IP core 12' as well as timing diagrams or the like. Such information may be analogous to the interconnection information provided in published data sheets for integrated circuits.

Figure 2:
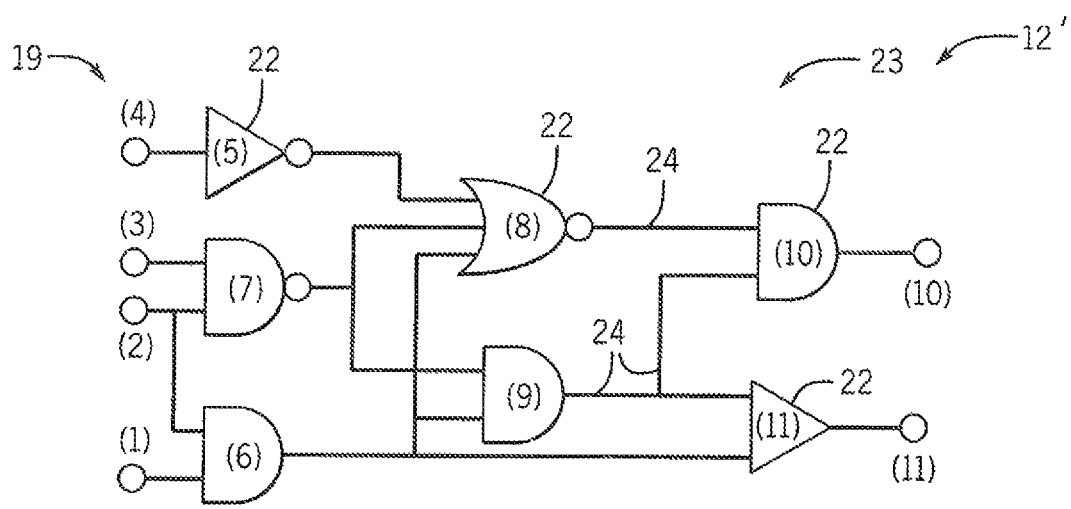
FIG. 2 is a simplified schematic of an integrated circuit such as may be encrypted with the present invention.

Referring now to FIG. 2, the IP core 12' may be constructed of multiple circuit elements, herein termed nodes 22, typically including but not limited to logic gates, such as Boolean AND gates, Boolean OR gates, Boolean NAND gates, Boolean NOR gates, and Boolean EXCLUSIVE OR (XOR) gates. Such logic gates and combinations of these logic gates will be termed standard Boolean gates.

Each of the nodes 22 may be interconnected by conductors, herein termed edges 24. Generally, the edges 24 represent electrical signal communication between outputs of nodes 22 and inputs of other nodes 22. Input terminals 19 and output terminals 23 for the IP core 12', serving as points of interconnection with other circuit elements or external devices, will also be represented as nodes 22 with four input nodes 22 (labeled 1-4) connecting via seven gate nodes 22 labeled (5-11), the outputs of the final gate nodes 22 (10, 11) providing output terminals identically numbered to their associated gates. For clarity, in the following description, the labels (1-11) of the nodes 22 will be placed in parentheses instead of the numeral normally identifying a node 22.

As depicted, input node (4) connects to the input of an inverter node (5) whose output connects to one of three inputs of a NOR gate of node (8). Input node (3) and input node (2) connect to two inputs of a NAND gate node (7). Input node (2) also connects to one input of an AND gate node (6) whose other input is connected to input node (1). The output of node (7) connects to one of the inputs of node (8) and to one input of an AND gate node (9). The output of node (6) connects to the remaining input of node (8) and node (9). This output of node (6) also connects to one input of an OR gate (11).

Figure 3:
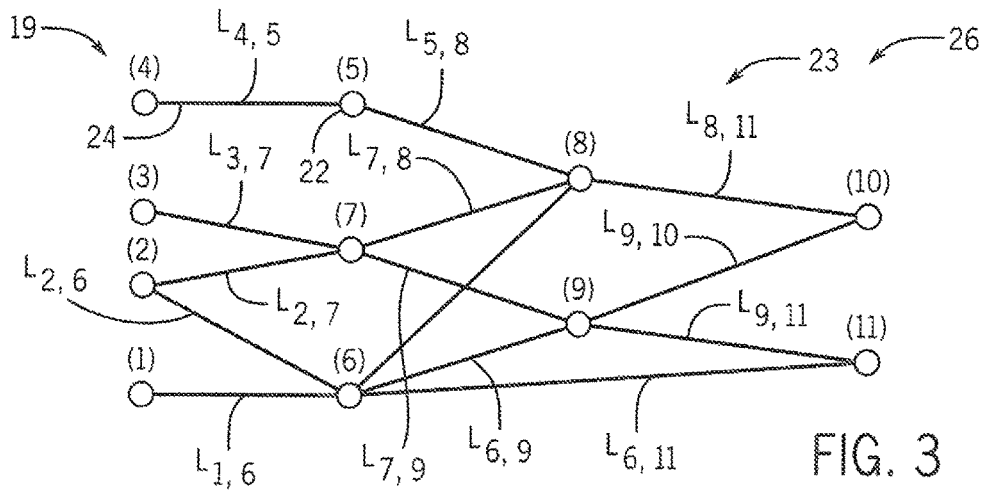
FIG. 3 is a graph representation of the integrated circuit of FIG. 2 as will be used for explanation of the invention which may be provided as part of a circuit description for simulation.

The topological essence of the schematic of FIG. 2 may be captured by a graph 26 of FIG. 3 in which the nodes 22 are replaced by vertices 22 having identical labels to the nodes 22 and the interconnecting wiring replaced by edges 24. As will be discussed below, each edge 24 may be numbered according to the two nodes 22 that it interconnects. Thus, for example, the edge connecting node (4) and (5) may be labeled $L_{4,5}$. Graph 26, as represented numerically, may provide the netlist 18 discussed above.

Referring again to FIG. 2, each gate of a node 22 can be identified by its unique label number which places it within the graph 26 and also may link it to a functional description. This functional description will typically be an unencrypted truth table 28 which may logically represent, as a set of input columns 30, values on different inputs to the node 22 where rows for these input columns express all possible combinations of inputs. An output column 32 provides the output value of the corresponding output of the node 22 for the given inputs of that row. With a normal Boolean logical function, the domain of the arguments and the range of the values are both limited to the two Boolean states of 0 and 1. The values and preparations of unencrypted truth tables 28 for standard Boolean functions are well known in the art.

Figure 4:
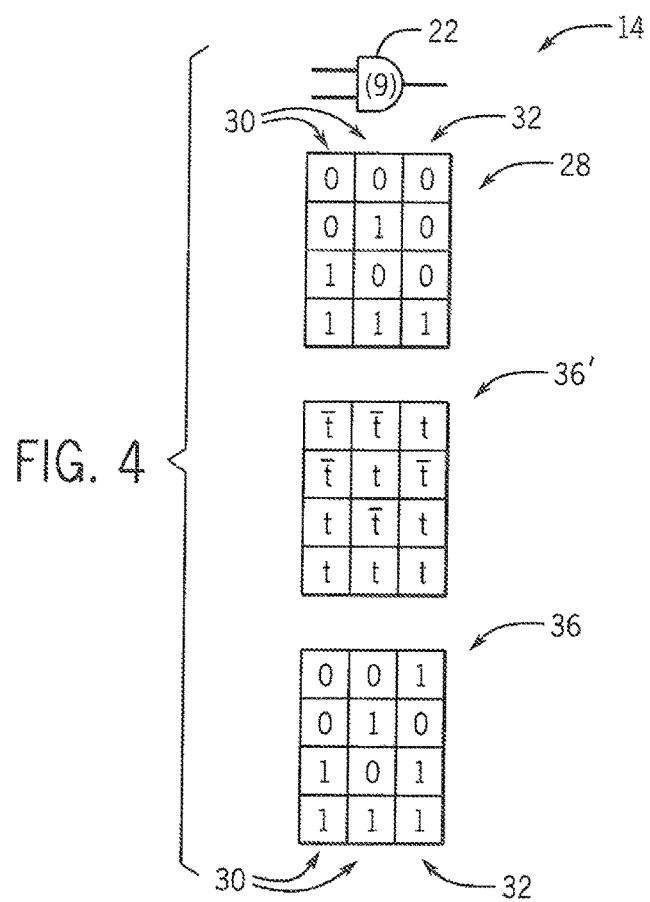
FIG. 4 is an example gate from the integrated circuit of FIG. 2 together with its truth table, a generalized functional encryption of the truth table per the present invention, and a specific implementation of the generalized encryption such as may be used with the present invention.
Figure 5:
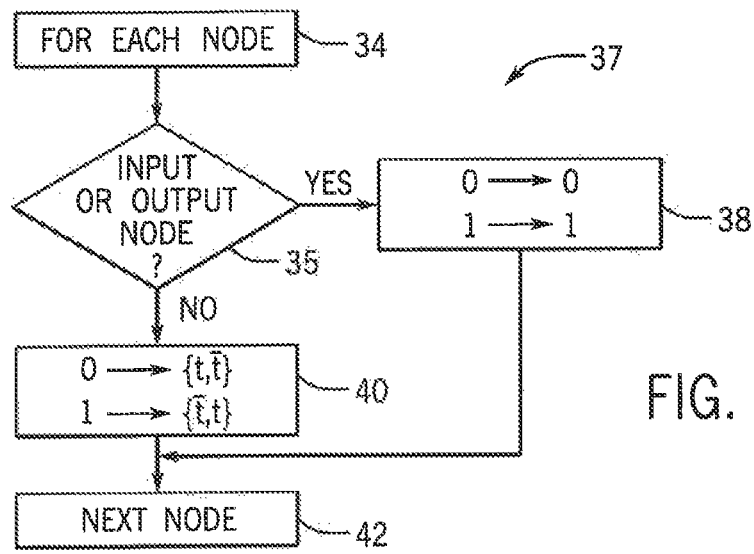
FIG. 5 is a flowchart of the node function encryption process of FIG. 4.
Figure 8:
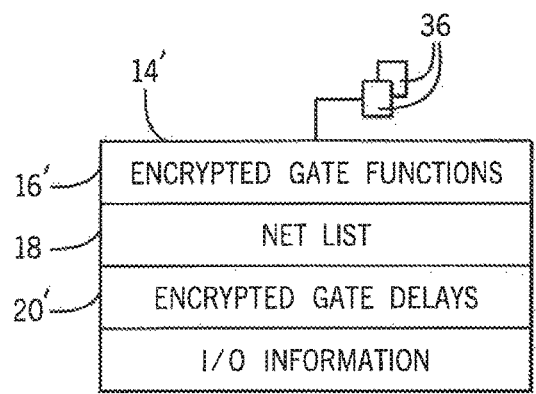
FIG. 8 is a logical description of an encrypted functional description that may be used in licensing an IP core.

Referring to FIGS. 2, 4 and 5, the present invention may encrypt the unencrypted truth table 28 by transforming the values of the unencrypted truth table 28 to arbitrary different values in an encrypted truth table 36 such as may form part of an encrypted functional description 14' shown in FIG. 8. Although the values of the encrypted truth tables 36 are arbitrary, they are selected so that the truth tables of interconnected nodes 22 use consistent values for the identical signal.

Referring particularly to FIG. 5, generation of the encrypted truth table 36 begins as indicated by process block 34 with an encryption program 37 which together with process block 42 provides a loop through each node 22 of the core 12'. Within this loop, for each node, a determination is made as to whether the node 22 is an input node (nodes 1-4) or output node (nodes 10 and 11 in this example) per decision block 35. If the node 22 is an input node, the value of the input node is left untransformed so that a value of 0 is forwarded to succeeding node 22 as a value of 0, and a value of 1 is forwarded to the succeeding node 22 as a value of 1. If the node 22 is an output node, the transformation of the output column 32 of the unencrypted truth table 28 for that node 22 is left in unencrypted form. That is, an actual value of the unencrypted truth table 28 of 0 will map to 0 in the encrypted truth table 36 and an actual value of 1 in the unencrypted truth table 28 will map to 1 in the encrypted truth table 36. These processes are shown by process block 38.

If the node 22 is not an output node, as determined at decision block 35, the values of the output of that node 22 may be arbitrarily mapped to a pair of values $\{t,\bar{t}\}$ as shown by process block 40. The values of $\{t,\bar{t}\}$ may be any two numerically distinct values including values of 0 and 1 provided that the mapping to $\{t,\bar{t}\}$ is suitably varied and the actual values of 0, and 1 of the unencrypted truth table are each mapped to unique different values. This process is then repeated for all gates as indicated by process block 42.

Referring in particular to FIG. 4, this process provides a generalized encryption for the AND gate of node 22 shown in encrypted truth table 36' and is obtained by mapping the output of node (6) of 0 to t and of 1 to $\bar{t}$, the output of node (7) of 0 to t̄ and of 1 to t and the output of node (9) of 0 to t and of 1 to t̄. When the value of t is chosen to be 0 and the value of t̄ is chosen to be 1 (as one possible option), a simplified encrypted truth table 36 may be produced representing logically the AND gate of node (9). As can be seen from inspection of encrypted truth table 36, the functional relationship of an AND gate is no longer discernible. Encrypted truth table 36 could be any of the functions of AND, NAND, OR, NOR, AND NOT, NOT OR, NOT AND, AND OR NOT recognizing that the gates before and after this gate can also be encrypted.

This encryption of the unencrypted truth tables 28 may also employ any of the techniques discussed above with respect to the Logical Encryption Invention. These techniques include adding additional rows to the truth table that are not invoked and using multiple different values to represent each logical state.

The mappings of the input columns 30 of each unencrypted truth table 28 to the different values of the encrypted truth table 36 will generally be done to preserve consistency with the mapping adopted by the earlier nodes 22 so that internal logic within the core 12' is preserved although recognizable only as between the input and output nodes. Importantly, because these mappings are used consistently throughout the IP core 12' (that each given edge 24 has a consistent mapping at its interconnected nodes 22), the logic of the mappings need not be preserved or provided to the simulator for decoding the encrypted truth tables 36 for simulation. Instead, the encrypted truth tables 36 forming the encrypted functional description 14' (shown in FIG. 8) may be used by the simulator directly without decoding because the consistency of this mapping process allows the proper output values to be obtained from given input values even though the mappings of all values at intermediate nodes 22 are largely unintelligible.

Figure 7:
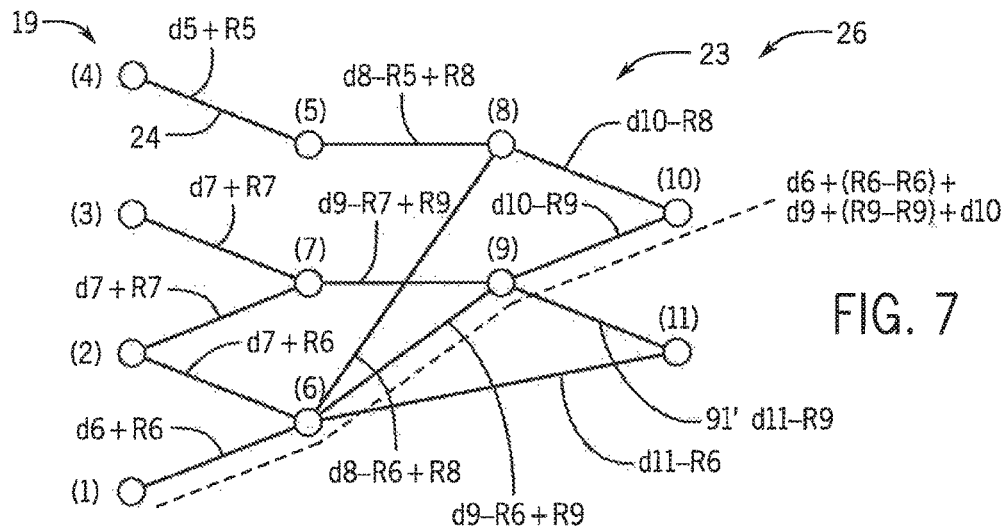
FIG. 7 is the graph representation of FIG. 3 showing a transformation of actual delay values to pseudo-delay values and an example sum of the pseudo-delay values through a given signal path from input to output of the integrated circuit per the flowchart of FIG. 6.

Referring now to FIG. 7, each node 22 also may be associated with an actual gate delay value determined by the circuit level implementation of the underlying gate of node 22. For example, node (5) may have a delay value of $d_5$ representing a delay between its receipt of an input signal at the input of node (5) and its generation of an output signal at the output of node (5). These delay values may be empirically determined or determined from inspection of the actual circuit implementation for the gate including transistor areas, incidental capacitances, and the like. In this regard, the actual delays will normally vary between gate types, the circuit configuration of the gate, and the state of the gate with respect to its current and previous inputs.

The present invention may assign these actual gate delays to the edges 24 of the graph 26 in order to, for example, to capture the delay of gate (7) in the edges connecting to the input of gate (7). That is, the actual gate delay for gate (7) may be assigned to the edge 24 connecting input node (3) to node (7) and, likewise, to the edge 24 connecting node (2) to node (7). This convention can be used by conventional circuit simulators and simplifies the encryption process but does not fundamentally change the circuit description while allowing delays caused by conductor links to also be accommodated.

Figure 6:
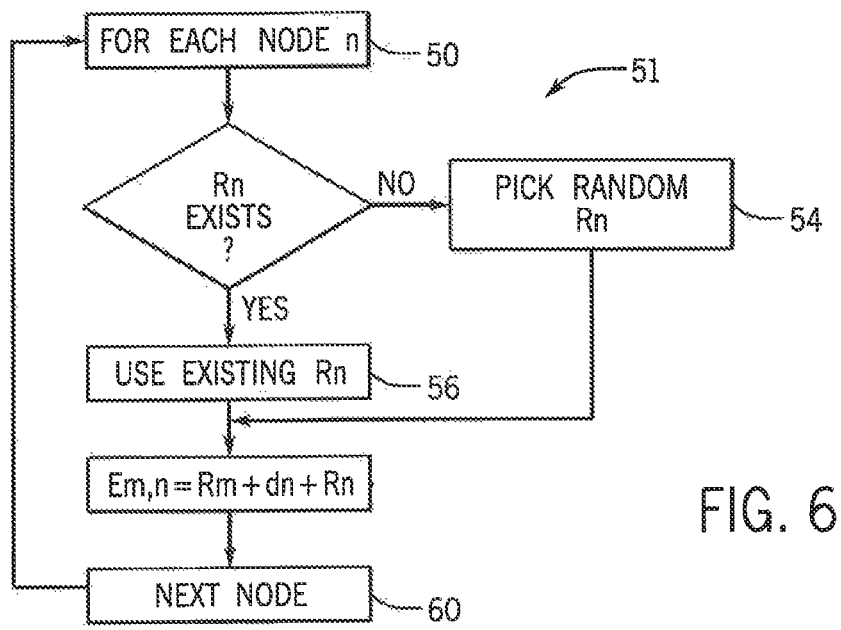
FIG. 6 is a flowchart of the node delay encryption process.

Referring now to FIG. 6, the actual delays $d_1$-$d_{11}$ associated with nodes (1)-(11) are then encrypted using a program 51 by adding random numbers $R_5$-$R_9$ to the values of $d_1$-$d_{11}$. This encryption process provides for encrypted gate delays 20' which may form part of an encrypted functional description 14' (shown in FIG. 8). Per process blocks 50 and 60, a loop may be generated moving through the nodes 22 from input to output to encrypt the gate delays $d_n$ according to the following equation (1):

$$E_{m,n} = -R_m + d_n + R_n \quad (1)$$

where:

$E_{m,n}$ is the encrypted delay corresponding to input m at node n $R_m$ is a random offset assigned to node m;

$d_n$ is the actual gate delay of node n; and $R_n$ is a random offset assigned to node n.

In this process, at each node n, it is determined whether any input to node n has previously been assigned a value of $R_n$. If so at process block 56 that existing value of $R_n$ will be used. Otherwise at process block 54 a random value of $R_n$ may be chosen. This value may be in an arbitrary range including negative and positive real rational numbers but is preferably positive and positive real numbers.

Once the value of $R_n$ is selected, equation (1) above may be used to generate the encrypted delay corresponding to each input m driving node n. This process is then repeated per process blocks 50 and 60 until values of $E_{m,n}$ have been computed for all edges 24.

Note that the random numbers $R_m$ and $R_n$ associated with the inputs of any given node n or m must be identical for that given node n or m. Generally this process may be performed by moving from inputs to outputs using the values of $R_m$ as previously assigned to the preceding nodes m and randomly selecting the values of $R_n$ for the succeeding nodes.

Thus, for the example of FIG. 2 as shown in FIG. 7, the following encrypted gate delays may be assigned to the edges 24:

| Net | Encrypted delay |
|---|---|
| 1 | (0) |
| 2 | (0) |
| 3 | (0) |
| 4 | (0) |
| 5 | ($E_{4,5} \equiv d_5 + R_5$) |
| 6 | ($E_{1,6} \equiv d_6 + R_6$, $E_{2,6} \equiv d_6 + R_6$) |
| 7 | ($E_{2,7} \equiv d_7 + R_7$, $E_{3,7} \equiv d_7 + R_7$) |
| 8 | ($E_{6,8} \equiv d_8 - R_6 + R_8$, $E_{7,8} \equiv d_8 - R_7 + R_8$, $E_{5,8} \equiv d_8 - R_5 + R_8$) |
| 9 | ($E_{6,9} \equiv d_9 - R_6 + R_9$, $E_{7,9} \equiv d_9 - R_7 + R_9$) |
| 10 | ($E_{9,10} \equiv d_{10} - R_9$, $E_{8,10} \equiv d_{10} - R_8$) |
| 11 | ($E_{6,11} \equiv d_{11} - R_6$, $E_{9,11} \equiv d_{11} - R_9$) |

Consider now the path of a signal through input node (1) through node (6), (9), and (10). The sum of the encrypted gate delays ($D_{total}$) along this path per FIG. 6 will be:

$$D_{total} = d_6 + (R_6 - R_5) + d_9 + (R_9 - R_9) + d_{10} \quad (2)$$

Thus even though the individual delays have been completely obscured by encryption, the total delay along a single propagation path from input to output will be identical to that of the unencrypted circuit.

It will be appreciated that the sum of the encrypted gate delays for each of the edges 24 need not equal zero but only a consistent value that can be subtracted out from the total delay from the output node, for example, using a final virtual edge to perform the subtraction process. Thus the sum of the encrypted gate delays along each signal path may equal any constant value or specific constant value associated with any given output node where that constant value is subtracted from the sum to obtain the actual delay values.

Referring to FIG. 8, an encrypted functional description 14' may thus be produced being substantially identical to the unencrypted functional description 14 but for the replacement of the gate list 16 with an encrypted gate list 16' and the replacement of the gate delays 20 with encrypted gate delays 20', both encrypted as discussed above.

In cases where it is desired to provide for a set of different gate delays for each node 22, for example, reflecting changes in gate delay according to the state of the node 22 defined by its present input values and previous input values, this process may be repeated for a vector of gate delay values associated with each node 22. Each of these different vector elements for a given node 22 of n may have different randomly selected values of R to obscure any possible information that could be derived from looking at differences in gate delays for different states. Each of the different vector elements will be associated with a different edge 24 (as before) and also with a given transition of that edge 24. For example in the general case of mappings of the truth table values to $\bar{t}$ and t, there will be four possible transitions ($\bar{t} \rightarrow t$, $t \rightarrow \bar{t}$, $\bar{t} \rightarrow \bar{t}$, and $t \rightarrow t$. The vector elements may assign a different random delay $R_n$ for each of these transitions which may be selected by the simulator depending on the transition.

Figure 9:
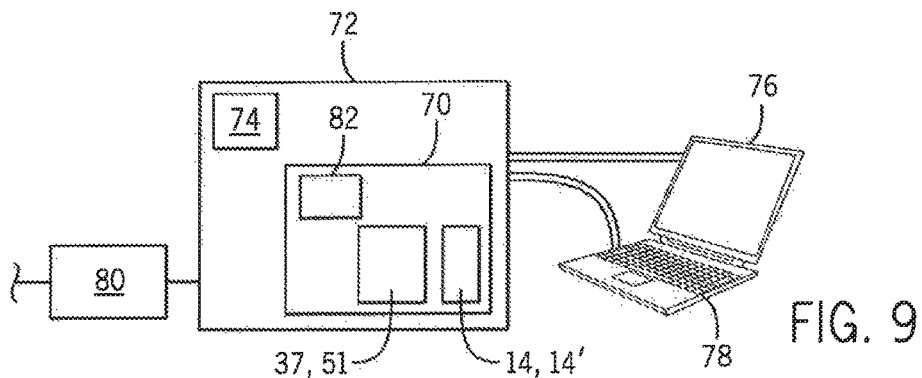
FIG. 9 is a simplified diagram on an electronic computer on which the present invention may operate or on which a simulator may operate.

Referring now to FIG. 9, programs 37 and 51 may be stored in non-transient, computer-readable memory 70 together with the necessary data structures of the unencrypted functional description 14 and encrypted functional description 14'. The computer readable memory 70 may be part of an electronic computer 72 including one or more processors 74 communicating with the memory 70 to execute the programs 37 and 51. The computer 72 may communicate with interface devices including a graphic display screen 76 and keyboard 78 to allow entry of user commands in order to perform the steps of encrypting a functional specification and gate delays described in this application and to provide displays as needed. An external data communication device 80, such as a removable disk drive or network adapter, may be used to communicate data to and from the computer including the unencrypted functional description 14 and the encrypted functional description 14'.

The same computer 72 or a different comparable computer may hold a simulation program 82 of conventional design that may receive the encrypted functional description 14' and without use of the information of the unencrypted functional description 14, may simulate the IP core 12' in conjunction with other cores 12 both with respect to functional operation and gate propagation delays as has been described above.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to memory, unless otherwise specified, can include one or more processor-readable and accessible memory elements and/or components that can be internal to the processor-controlled device, external to the processor-controlled device, and can be accessed via a wired or wireless network. The term "core" should generally be understood to include any large-scale integrated circuit having proprietary features.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

What we claim is:

1. An encryptor for digital circuit description files comprising:
    an electronic computer executing a program stored in non-transient medium to:
    (a) receive electronically readable input data defining an underlying digital circuit having multiple interconnected nodes each implementing standard Boolean functions and interconnected between a set of inputs and a set of outputs, the input data describing the interconnection of the nodes, the Boolean functions of the nodes, and actual signal propagation delays associated with the nodes;
    (b) create encrypted output data describing the interconnection of the nodes and providing an encryption of the actual signal propagation delays, the encryption of the actual signal propagation delays permitting computation of cumulative signal propagation delays between the set of inputs and set of outputs without knowledge of the actual signal propagation delays of the nodes; and
    (c) output the encrypted output data in a form adapted to permit a simulation of the underlying digital circuit to provide a simulation set of outputs having propagation delays with respect to a simulation set of inputs identical to propagation delays at the set of outputs of the underlying digital circuit receiving the simulation inputs at the set of inputs of the underlying digital circuit.

2. The encryptor of claim 1 wherein the encryption of the actual signal propagation delays replaces actual signal propagation delays for at least some given nodes with pseudo-propagation delay different from the actual signal propagation delays of the given nodes.

3. The encryptor of claim 2 wherein the pseudo-propagation delay adds an offset value to the actual signal propagation delay for that node where the actual offset value varies among nodes.

4. The encryptor of claim 3 wherein the offset values are selected so that the offset values along a path through a given set of nodes from the input set to the output set sum to zero.

5. The encryptor of claim 4 wherein the offset values are selected pseudo-randomly.

6. The encryptor of claim 2 wherein a given node gets different pseudo-propagation delays for each edge between an output of the given node and an input of another node.

7. The encryptor of claim 2 wherein the actual propagation delays provide different delay values for different node states defined by current inputs of the node and previous inputs of the node and wherein the pseudo-propagation delay is provided for each different delay value.

8. The encryptor of claim 1 wherein an encryption of the actual signal propagation delay associated with a path between nodes n and m will be equal to an actual gate delay of the node n plus an arbitrary offset minus an arbitrary offset associated with a path to an input of the node n.

9. The encryptor of claim 8 wherein the arbitrary offsets on paths to each given node n are equal.

10. The encryptor of claim 1 wherein the function of the nodes in the electronically readable input data are described by an unencrypted truth table having entries that link input values of nodes to outputs values from the nodes according to the functions of the nodes;
wherein the encrypted output data further includes encrypted truth tables permitting computation of node outputs from node inputs according to the function of the nodes where the encrypted truth tables are different from corresponding unencrypted truth tables by having at least one row representing a relationship between input and output values not in the corresponding unencrypted truth tables; and
wherein encrypted output data is in a form adapted to permit a simulation of the digital circuit using the encrypted truth tables without decryption to receive inputs and provide outputs for the nodes; the simulation receiving unencrypted simulation inputs to provide simulation outputs identical to output of the digital circuit receiving the unencrypted simulation inputs.

11. The encryptor of claim 10 wherein the unencrypted truth tables describe functions selected from the group consisting of: Boolean AND function, Boolean OR function, Boolean NAND function, Boolean NOR function, and Boolean XOR function.

12. The encryptor of claim 1 wherein the electronic computer further executes the program to:
apply the encrypted output data to a simulator to simulate operation of the underlying digital circuit using the encrypted output data by propagating input signals from a simulation set of inputs to the simulation set of outputs.

13. The encryptor of claim 12 wherein the step of simulating operation of the underlying digital circuit provides signal propagation delays between the set of inputs and set of outputs.

14. The encryptor of claim 13 wherein the simulator operates without receipt of the actual signal propagation delays.

15. A method of encrypting a digital circuit file description using an electronic computer executing a program stored in non-transient medium to:
(a) receive electronically readable input data defining an underlying digital circuit having multiple interconnected nodes each implementing standard Boolean functions and interconnected between a set of inputs and a set of outputs, the input data describing the interconnection of the nodes, the Boolean functions of the nodes, and actual signal propagation delays associated with the nodes;
(b) create encrypted output data describing the interconnection of the nodes and providing an encryption of the actual signal propagation delays, the encryption of the actual signal propagation delays permitting computation of cumulative signal propagation delays between the set of inputs and set of outputs without knowledge of the actual signal propagation delays of the nodes; and
(c) output the encrypted output data in a form adapted to permit a simulation of the underlying digital circuit to provide a simulation set of outputs having propagation delays with respect to a simulation set of inputs identical to propagation delays at the set of outputs of the underlying digital circuit receiving the simulation inputs at the set of inputs of the underlying digital circuit.

16. The method of claim 15 wherein the encryption of the actual signal propagation delays replaces actual signal propagation delays for at least some given nodes with pseudo-propagation delays different from the actual signal propagation delays of the given nodes.

17. The method of claim 16 wherein the pseudo-propagation delay adds an offset value to the actual signal propagation delay for that node where the actual offset value varies among nodes.

18. The method of claim 17 wherein the offset values are selected so that the offset values along a path through a given set of nodes from the input set to the output set sum to zero.

19. The method of claim 15 wherein an encrypted delay associated with a path between nodes n and m will be equal to an actual gate delay of the node n plus an arbitrary offset minus an arbitrary offset associated with a path to an input of the node n.

20. The method of claim 19 wherein the arbitrary offsets on paths to each given node n are equal.

* * * * *